(12) United States Patent
Hanlon et al.

(10) Patent No.: US 7,284,989 B1
(45) Date of Patent: Oct. 23, 2007

(54) ELECTRICAL CONNECTOR SYSTEM FOR A REMOVABLE VEHICLE SEAT

(75) Inventors: Samuel R. Hanlon, Southfiled, MI (US); John F. Nathan, Highland Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/467,701

(22) Filed: Aug. 28, 2006

(51) Int. Cl.
*B60N 2/10* (2006.01)

(52) U.S. Cl. .................. 439/34; 439/660; 439/700; 296/65.03

(58) Field of Classification Search .................. 439/34, 439/700, 374, 660, 752, 5; 297/217.3; 296/65.03, 296/65.05
See application file for complete search history.

(56) References Cited

U.S. PATENT DOCUMENTS

| 6,050,835 | A | 4/2000 | Henrion et al. |
|---|---|---|---|
| 6,250,703 | B1 | 6/2001 | Cisler et al. |
| 6,279,981 | B1 | 8/2001 | Mesnage |
| 6,652,304 | B1 | 11/2003 | Chalons et al. |
| 6,752,445 | B1 | 6/2004 | Koehler et al. |

FOREIGN PATENT DOCUMENTS

| EP | 0855308 | 7/1998 |
|---|---|---|
| WO | 0035055 | 6/2000 |
| WO | 02096698 | 12/2002 |
| WO | WO 2004/078514 A2 | 9/2004 |

*Primary Examiner*—Neil Abrams
(74) *Attorney, Agent, or Firm*—Brooks Kushman P.C.

(57) ABSTRACT

Electrical connectors for removable vehicle seats are provided. In at least one embodiment, an electrical connector system for a removable vehicle seat including an axle and a locator mounted to the axle is provided. The system includes a first electrical connector rotatably mounted to the axle. The system also includes a second electrical connector. The locator positions the first electrical connector relative to the second electrical connector such that the first electrical connector and the second electrical connector are electrically connected. The first electrical connector may include slidable spring biased contact pins or in another embodiment may include outwardly biased contact wings.

17 Claims, 4 Drawing Sheets

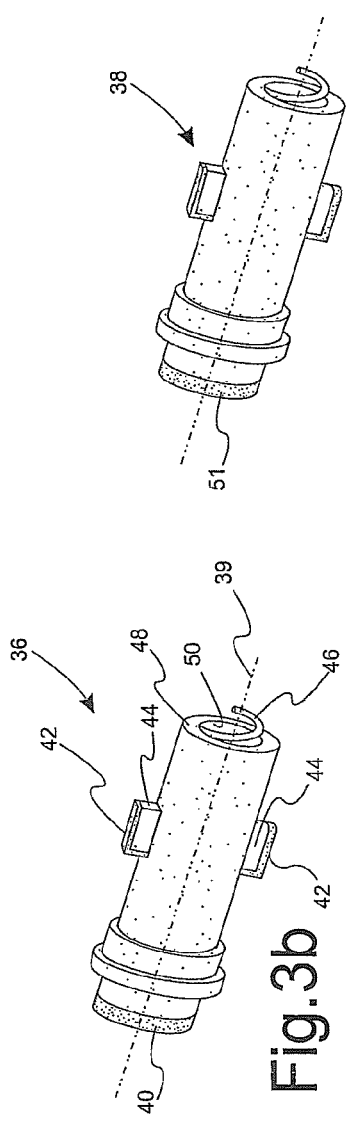
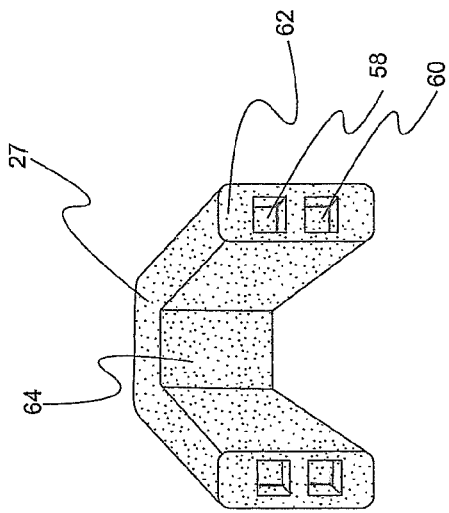
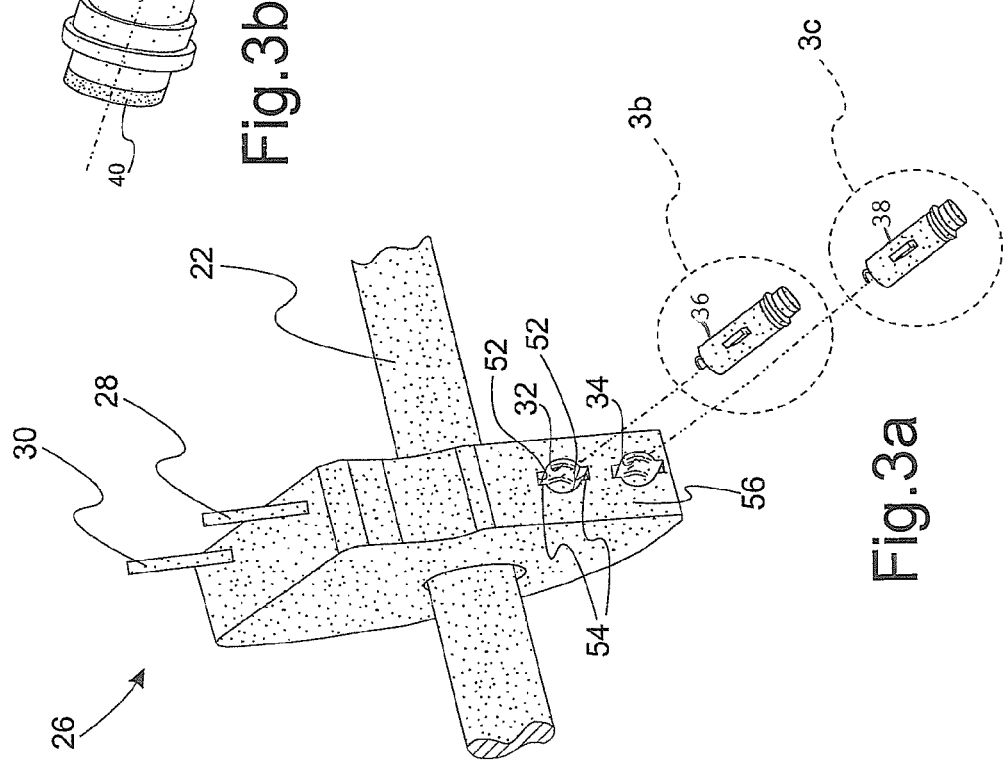

ELECTRICAL CONNECTOR SYSTEM FOR A REMOVABLE VEHICLE SEAT

BACKGROUND OF THE INVENTION

The invention relates to electrical connector systems for removable vehicle seats.

SUMMARY

In at least one embodiment, the invention takes the form of a first electrical connector integrated with a latching mechanism of a removable vehicle seat and a second electrical connector integrated with a striker subassembly of a vehicle. By installing the removable vehicles seat in the vehicle, the first electrical connector and the second electrical connector are aligned and electrically connected.

In at least one embodiment, the invention takes the form of an electrical connector system for a removable vehicle seat including an axle and a locator mounted to the axle. The system includes a first electrical connector rotatably mounted to the axle. The first electrical connector includes a first terminal, a first receiving portion including a first conductive portion electrically connected with the first terminal, and a first insert having a first conductive end and a second conductive portion electrically connected with the first end. The first insert is received by the first receiving portion. The second conductive portion is in contact with the first conductive portion if the first insert is inserted into the first receiving portion. The system also includes a second electrical connector including a third conductive portion. The locator positions the first electrical connector relative to the second electrical connector such that the first end is in contact with the third conductive portion.

In at least one embodiment, the invention takes the form of an electrical connector system for a removable vehicle seat including an axle and locator mounted to the axle. The system includes a first electrical connector rotatably mounted to the axle. The first electrical connector includes a tongue portion, a first terminal, and a first wing portion including a first conductive portion electrically connected with the first terminal. The first wing portion is moveable relative to the tongue portion. The system also includes a second electrical connector including a receiving portion configured to receive the tongue portion. The receiving portion includes a second conductive portion. The locator positions the first electrical connector relative to the second electrical connector in a mating position such that the first conductive portion is in contact with the second conductive portion.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIGS. 3a-3c show a portion of the system of FIG. 1.

FIG. 4 shows a portion of the system of FIG. 1.

DETAILED DESCRIPTION

Figure 1A:
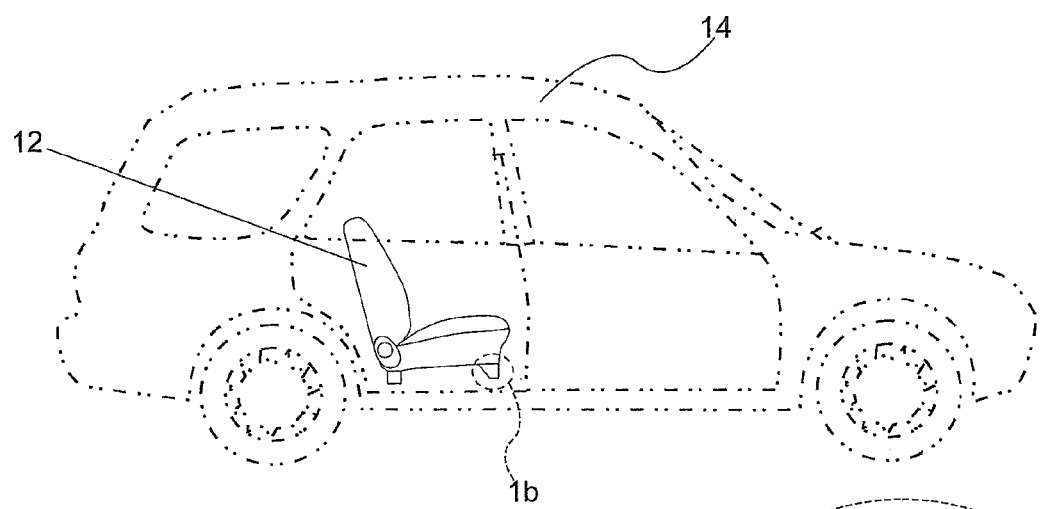
FIGS. 1a-1c show a system in accordance with an embodiment of the invention.
Figure 1C:
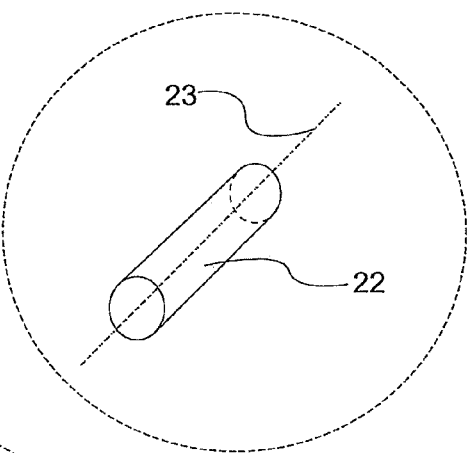
Figure 1B:
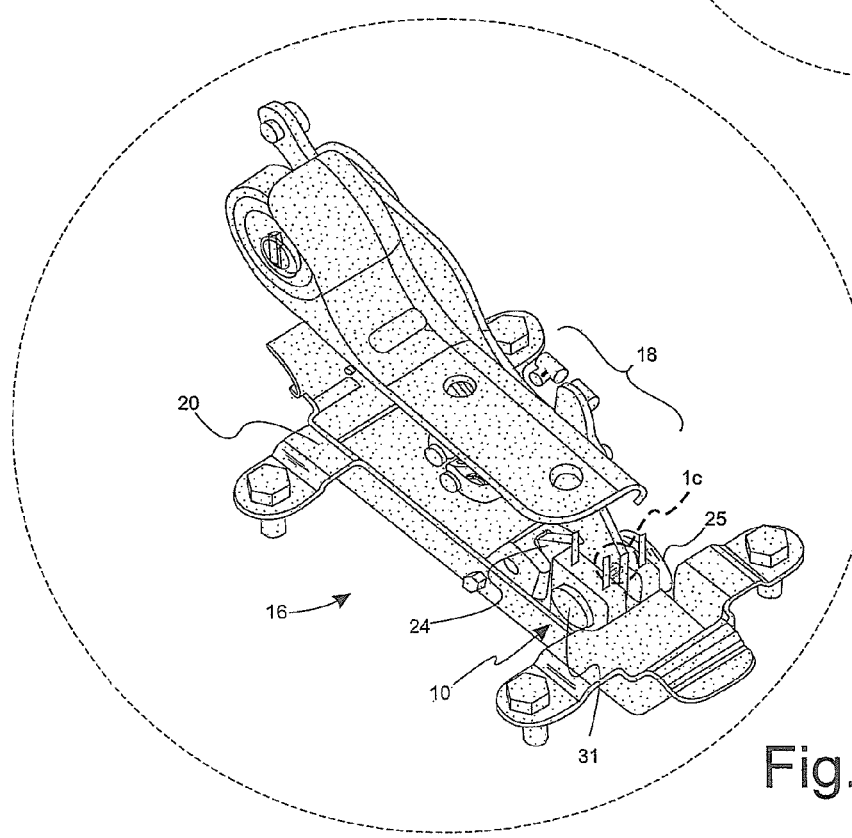

FIGS. 1a-1c show electrical connector system 10 for removable vehicle seat 12 of vehicle 14 in its environment 16. Environment 16 includes seat latch mechanism 18, striker tray 20, axle 22 having axis 23, tongue 24 rotatably mounted to axle 22, wheel 25 mounted to axle 22, and rivet 31.

Figure 2:
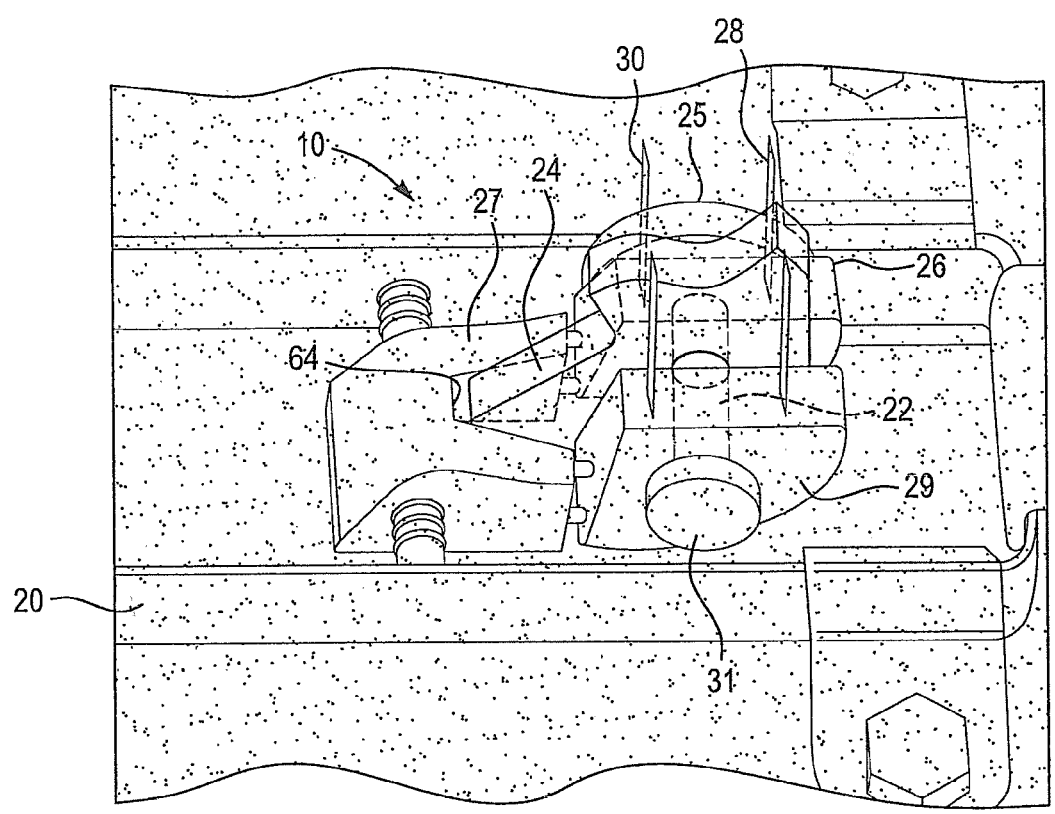
FIG. 2 shows the system of FIG. 1.

FIG. 2 shows system 10 in greater detail. System 10 includes male electrical connectors 26, 29 and female electrical connector 27. Connectors 26, 29 are rotatably mounted to axle 22. Connector 27 is mounted, e.g., bolted, to striker tray 20. Recessed area 64 of connector 27 receives tongue 24. Wheel 25 rotates about axle 22.

FIG. 3 shows connector 26. Connector 26 includes terminals 28, that may be connected to an electrical system (not shown) for removable seat 12, and recessed areas 32, 34 for receiving cylindrical pins 36, 38 as will be explained in detail below. Connector 29 is configured similarly to connector 26.

Pin 36 has axis 39 and includes metal tip 40 and metal slider 42 located on key portion 44. Metal slider 42, however, may be located in any suitable position on pin 36. Tip 40 and slider 42 are electrically connected via, for example, a metallic strip (not shown), and are insert molded with pin 36 in such materials as polypropylene, nylon, or polyethylene. Pin 36, however, may be manufactured using any suitable technique and material. Pin 36 also includes spring 46 located on end 48 of pin 36 opposite tip 40. Spring 46 sets in recessed area 50 configured to receive spring 46. Pin 38 is configured similarly to pin 36 and includes metal tip 51.

Recessed area 32 includes metal strip 52. Metal strip 52 and terminal 28 are electrically connected via, for example, a metal wire (not shown). Metal strip 52 and terminal 28 may also, for example, be made from a continuous piece of metal. Metal strip 52 and terminal 28 are insert molded with connector 26 in such materials as polypropylene, nylon, or polyethylene. Connector 26, however, may be manufactured using any suitable technique and material. Recessed area 32 includes slot 54 configured to receive key portion 44. Metal strip 52 is located within slot 54. Metal strip 52, however, may be located in any suitable position within recessed area 32. Recessed area 32 is thus configured to receive pin 36. Recessed area 34 is configured similarly to recessed area 32 and is thus configured to receive pin 38.

If pin 36 is inserted into recessed area 32, metal slider 42 will contact metal strip 52 thereby electrically connecting terminal 28 with tip 40, tip 40 will generally extend beyond mating surface 56 of connector 26, and pin 36 will be moveable relative to connector 26. Spring 46 will resist movement of pin 36 relative to connector 26 as pin 36 is seated deeper within recessed area 32. Once inserted, axis 39 of pin 38 is generally perpendicular to axis 23 of axle 22.

FIG. 4 shows connector 27. Connector 27 includes contact surfaces 58, 60, positioned on mating surface 62. Surfaces 58, 60 are electrically conductive, e.g., copper, and may be connected to an electrical power system (not shown) for vehicle 14. Surfaces 58, 60 may be recessed such that they may receive tips 40, 51 respectively.

Connector 27 also includes recessed area 64 configured to receive tongue 24. As such, tongue 24 may assist in locating connector 26 relative to connector 27 such that tips 40, 51 are in contact with surfaces 58, 60 respectively thereby electrically connecting surfaces 58, 60 with terminals 28, 30 respectively.

Referring to FIG. 2, wheel 25 may assist in locating connector 26 relative to connector 27 via striker tray 20 such that tips 40, 51 are in contact with surfaces 58, 60 respectively thereby electrically connecting surfaces 58, 60 with terminals 28, 30 respectively.

Figure 5:
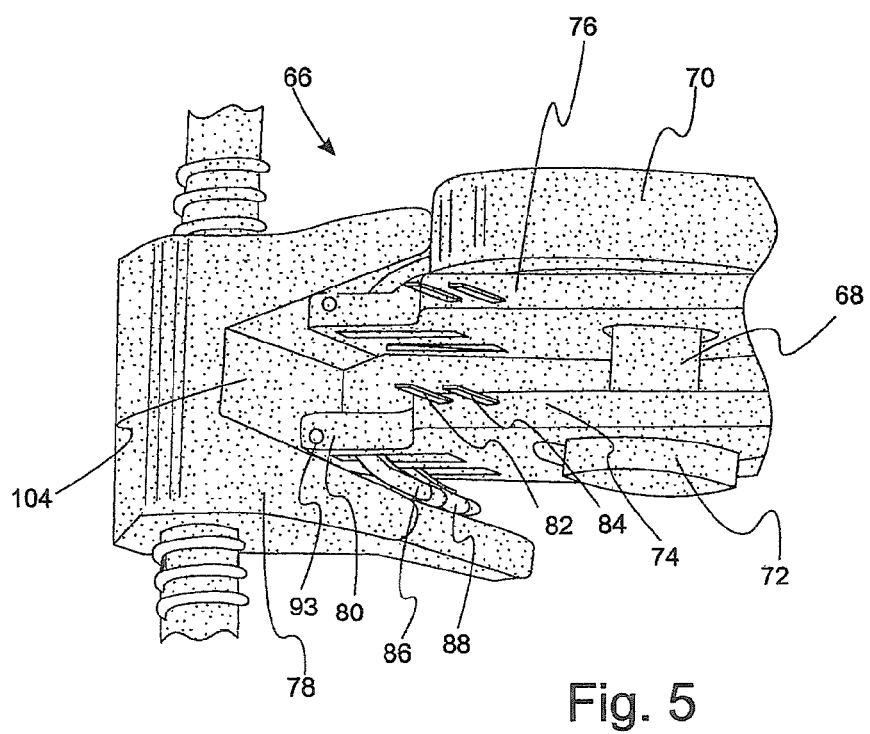
FIG. 5 shows a system in accordance with an embodiment of the invention.

FIG. 5 shows an alternative embodiment of electrical connector system 66. The environment similarly includes axle 68, wheel 70 mounted to axle 68, and rivet 72.

System 66 includes winged connectors 74, 76 and receiving connector 78. Connectors 74, 76 are rotatably mounted to axle 68. Connector 78 is mounted, e.g., bolted, to striker tray 20 (FIG. 1). Connector 74 includes tongue 80, terminals 82, 84, and wings 86, 88. Connector 76 is similarly configured to connector 74.

Figure 6:
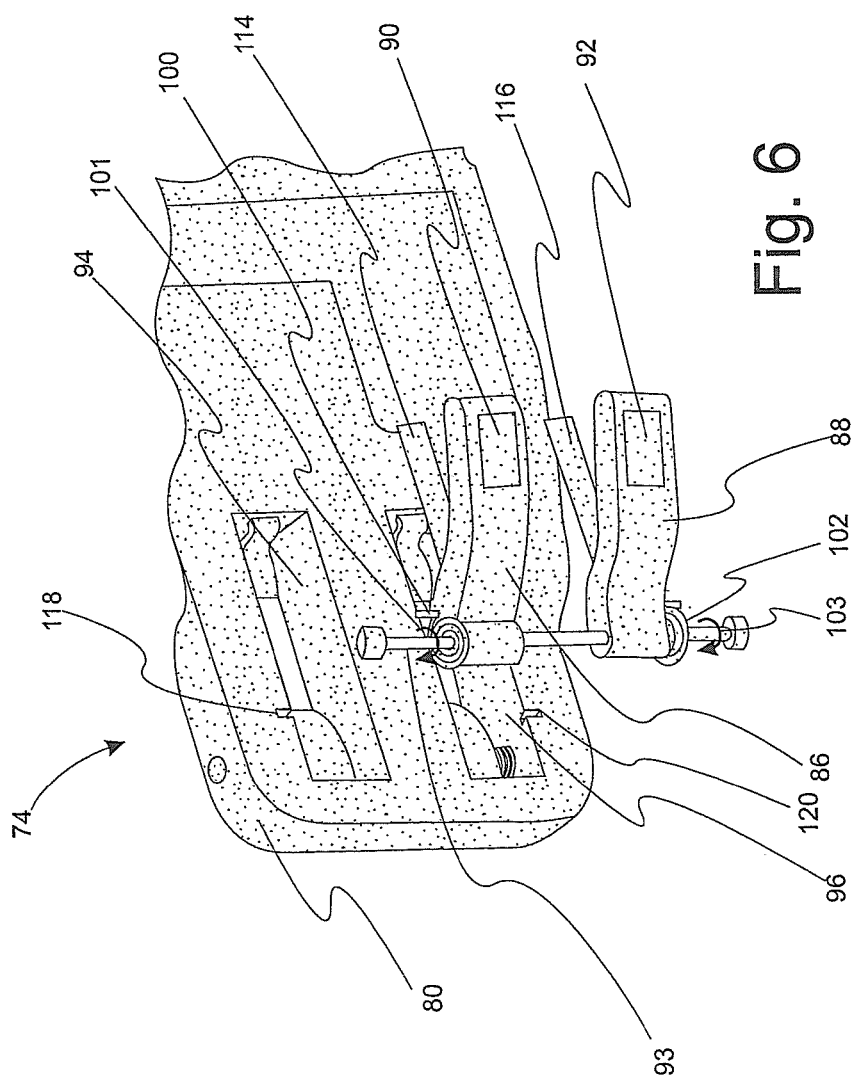
FIG. 6 shows a portion of the system of FIG. 5.

FIG. 6 shows connector 74. Wings 86, 88 include contact surfaces 90, 92 respectively. Surfaces 90, 92 are electrically conductive, e.g., copper, and are electrically connected with terminals 82, 84 respectively as will be explained in detail below. Surfaces 90, 92 are portions of L-shaped electrically conductive, e.g. copper, components 114, 116 respectively. Components 114, 116 are insert molded with wings 86, 88 respectively in materials such as polypropylene, nylon, or polyethylene. Wings 86, 88, however, may be manufactured using any suitable technique and material. A portion of L-shaped components 114, 116 resides within slots 94, 96 respectively. Slots 94, 96 accommodate the movement of wings 86, 88 respectively. Terminals 82, 84 (FIG. 5) are insert molded with tongue 80 using materials such as polypropylene, nylon, or polyethylene. Terminals 82, 84 extend through tongue 80 such that a portion of each of terminals 82, 84 contacts, e.g. overlaps, the portion of each of L-shaped components 114, 116 residing within slots 94, 96 respectively. Wings 86, 88 are moveable relative to tongue 80 about axle 93.

Connector 74 includes springs 100, 102 associated with wings 86, 88 respectively. Springs 100, 102 are capable of applying forces 101, 103 respectively to wings 86, 88 respectively as will be explained in detail below. Springs 100, 102 are rotary torsion springs. One end of spring 100, for example, is inserted into a hole (not shown) of wing 86. An opposite end of spring 100, for example, is inserted into slot 118 in tongue 80. Prior to installation, the spring 100 is pretensioned. Spring 102, would be similarly installed into a hole (not shown) in wing 88 and slot 120 in tongue 80.

Figure 7:
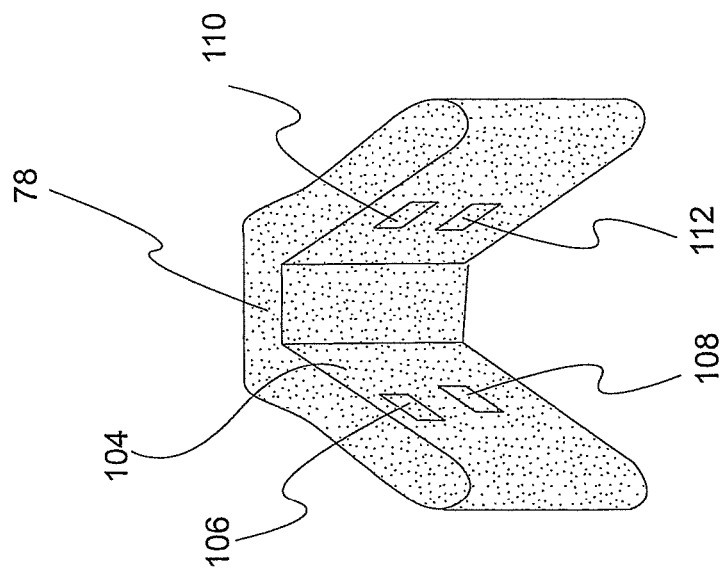
FIG. 7 shows a portion of the system of FIG. 5.

FIG. 7 shows connector 78. Connector 78 includes recessed area 104 configured to receive tongue 80. Connector 78 also includes contact surfaces 106, 108, 110, 112 that are electrically conductive, e.g., copper, and may be connected to an electrical power system (not shown) for vehicle 14. Surfaces 106, 108, 110, and 112 may be convex or concave to facilitate contact between, for example, surface 106 and surface 90. Surfaces 106, 108, 110, and 112, however, may have any suitable shape.

Referring to FIGS. 5, 6, and 7 wheel 70 may assist in positioning connectors 74, 76 relative to connector 78 via striker tray 20 (FIG. 1) in a mating position such that surfaces 90, 92 are in contact with surfaces 106, 108 thereby electrically connecting surfaces 106, 108 with terminals 82, 84 respectively. In the mating position, wings 86, 88 are held in place relative to connector 78 at least by forces 101, 103 respectively.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An electrical connector system for a removable vehicle seat including an axle and a locator mounted to the axle, the system comprising:
   a first electrical connector rotatably mounted to the axle and including a first terminal, a first receiving portion including a first conductive portion electrically connected with the first terminal, and a first insert having a first conductive end and a second conductive portion electrically connected with the first end, wherein the first insert is configured to be received by the first receiving portion, and wherein the second conductive portion is in contact with the first conductive portion if the first insert is inserted into the first receiving portion thereby electrically connecting the first end with the first terminal; and
   a second electrical connector including a third conductive portion;
   wherein the locator is capable of positioning the first electrical connector relative to the second electrical connector such that the first end is in contact with the third conductive portion thereby electrically connecting the third conductive portion with the first terminal.

2. The system of claim 1 wherein the first electrical connector further includes a second terminal, a second receiving portion including a fourth conductive portion electrically connected with the second terminal, and a second insert having a second conductive end and a fifth conductive portion electrically connected with the second end, wherein the second insert is configured to be received by the second receiving portion and wherein the fifth conductive portion is in contact with the fourth conductive portion if the second insert is inserted into the second receiving portion thereby electrically connecting the second end with the second terminal.

3. The system of claim 2 wherein the second electrical connector further includes a sixth conductive portion and wherein the locator is further capable of positioning the first electrical connector relative to the second electrical connector such that the second end is in contact with the sixth conductive portion thereby electrically connecting the sixth conductive portion with the second terminal.

4. The system of claim 1 wherein at least a portion of the first insert is cylindrical.

5. The system of claim 1 wherein the first insert includes a key portion and wherein the key portion includes the second conductive portion.

6. The system of claim 5 wherein the first receiving portion includes a slotted portion configured to receive the key portion and wherein the slotted portion includes the first conductive portion.

7. The system of claim 1 wherein the second electrical connector includes a third receiving portion, the system further comprising a tongue portion rotatably mounted to the axle and configured to be received by the third receiving portion.

8. The system of claim 1 wherein the first insert has a first axis and the axle has a second axis and wherein the first axis is generally perpendicular to the second axis if the first insert is inserted into the first receiving portion.

9. The system of claim 1 wherein the first electrical connector includes a first mating surface, wherein at least a portion of the first end extends beyond the first mating surface if the first insert is inserted into the first receiving portion thereby forming a male portion, and wherein the second electrical connector includes a second mating surface including a female portion configured to receive the male portion.

10. The system of claim 1 wherein the first insert further includes a spring located on a second end of the first insert generally opposite the first end, wherein the first insert is moveable relative to the first electrical connector if the first insert is inserted into the first electrical connector, and wherein the spring is capable of resisting the movement of the first insert.

11. An electrical connector system for a removable vehicle seat including an axle and locator mounted to the axle, the system comprising:
- a first electrical connector rotatably mounted to the axle and including a tongue portion, a first terminal, and a first wing portion including a first conductive portion electrically connected with the first terminal, wherein the first wing portion is moveable relative to the tongue; and
- a second electrical connector including a receiving portion configured to receive the tongue portion, wherein the receiving portion includes a second conductive portion;

wherein the locator is capable of positioning the first electrical connector relative to the second electrical connector in a mating position such that the first conductive portion is in contact with the second conductive portion thereby electrically connecting the second conductive portion with the first terminal.

12. The system of claim 11 wherein the first electrical connector further includes a first spring capable of applying a first force to the first wing portion.

13. The system of claim 12 wherein the first wing portion is held in place relative to the second electrical connector at least by the first force if the first and second electrical connectors are in the mating position.

14. The system of claim 11 wherein the first electrical connector further includes a second terminal and a second wing portion including a third conductive portion electrically connected with the second terminal and wherein the second wing portion is moveable relative to the tongue.

15. The system of claim 14 wherein the receiving portion further includes a fourth conductive portion and wherein the locator is further capable of positioning the first electrical connector relative to the second electrical connector in the mating position such that the third conductive portion is in contact with the fourth conductive portion thereby electrically connecting the fourth conductive portion with the second terminal.

16. The system of claim 15 wherein the first electrical connector further includes a second spring capable of applying a second force to the second wing.

17. The system of claim 16 wherein the second wing portion is held in place relative to the second electrical connector at least by the second force if the first and second electrical connectors are in the mating position.

* * * * *